United States Patent [19]

Wapelhorst et al.

[11] 4,105,482

[45] Aug. 8, 1978

[54] METHOD OF VULCANIZING A PREVULCANIZED TREAD

[75] Inventors: Friedrich-Wilhelm Wapelhorst, Lauben; Heinz-Dieter Kalkoff, Witten, both of Germany

[73] Assignee: Lieselotte Trappe, Wetter, Germany

[21] Appl. No.: 571,441

[22] Filed: Apr. 28, 1975

[30] Foreign Application Priority Data

Apr. 26, 1974 [DE] Fed. Rep. of Germany ....... 2420220

[51] Int. Cl.² ..................... B29H 17/00; B29H 17/37
[52] U.S. Cl. .................... 156/96; 150/54 B; 156/86; 156/394; 156/128 R
[58] Field of Search .............. 156/84, 85, 86, 95, 156/96, 123, 128, 143, 144, 285, 381, 382, 394, 394 FM; 23/290; 150/54 R, 54 A, 54 B

[56] References Cited

U.S. PATENT DOCUMENTS

| | | | |
|---|---|---|---|
| 1,128,480 | 2/1915 | Miller | 156/128 R |
| 1,306,602 | 6/1919 | McEwen | 156/96 |
| 2,627,644 | 2/1953 | Foster | 156/84 |
| 2,899,534 | 8/1959 | Sjolund | 23/290 |
| 2,976,910 | 3/1961 | Nowak | 156/96 |
| 3,149,658 | 9/1964 | Wolfe | 156/95 |
| 3,325,326 | 6/1967 | Schelkmann | 156/96 |
| 3,672,009 | 6/1972 | Pike | 23/290 |
| 3,738,893 | 6/1973 | Edler | 156/96 |
| 3,752,719 | 8/1973 | Borden | 156/86 |
| 3,769,121 | 10/1973 | Martin | 156/128 |
| 3,904,459 | 9/1975 | Schelkmann | 156/96 |
| 3,925,129 | 12/1975 | Blankenship | 156/96 |
| 3,933,551 | 1/1976 | Brodie et al. | 156/96 |

Primary Examiner—John E. Kittle

[57] ABSTRACT

A method for retreading a tire carcass having an arcuate crown with a transversely flat, prevulcanized profiled tread comprising applying the tread to the crown of the carcass with an intermediate layer of unvulcanized bonding rubber therebetween thereby deforming the tread to conform to the crown while preventing the occlusion of air between the tread and carcass, securing an elastic, pressure-permeable fabric or elastomeric stressing belt annularly around the assembled tread and carcass and vulcanizing the intermediate layer of bonding rubber by applying heat and pressure while preventing deformation of the carcass, slippage or raised edges of the tread and uneven distribution of the bonding rubber layer. Also disclosed are a stressing belt and an autoclave structure and method of autoclave operation for use in the above-described method.

24 Claims, 20 Drawing Figures

METHOD OF VULCANIZING A PREVULCANIZED TREAD

BACKGROUND OF THE INVENTION

The present invention relates to a method for vulcanizing a prevulcanized, particularly flat profiled tread, also in annular form by means of an unvulcanized bonding rubber intermediate layer, particularly in the form of a bonding rubber plate onto a vehicle tyre accompanied by pressure application in a chamber heated with steam, a steam-air mixture, air or water.

In a known method of this type the built tyre is at least outwardly sealingly enclosed by a casing. The chamber between the built tyre and the casing is either subjected to the action of a vacuum from the inside and/or overpressure from the outside, so that the casing rests tightly against the applied tread and whereby either under the action of the vacuum or through the action of the externally applied overpressure or through the vacuum and overpressure simultaneously any air occlusions are removed or forced from the tyre structure or from the chamber between the casing and the built tyre. Simultaneously, the casing applied to the tyre under a vacuum and/or overpressure brings about the cohesion of the built tyre, so that for example the edges of the tread cannot lift from the carcase during the reduction of the adhesive power of the bonding rubber resulting from the temperature. Flexible casings of this type are relatively expensive and have only a limited life, whilst their flexibility is also time-dependent.

Attempts have also already been made, without using a flexible casing of the type indicated hereinbefore to securely grip the tread all round in order to avoid any detachment of the tread during the first phase of the heating process. However, it has been found that the fixed clamping members used for clamping the built tyre cause undesired buckling or deformation of the tyre and also an undesired displacement of the tread relative to the carcase through a non-uniform distribution of the pressure exerted. It has hitherto not proved possible to avoid such displacements of the tread and deformations of the tyre.

BRIEF SUMMARY OF THE INVENTION

The problem of the present invention is therefore to so improve the method described hereinbefore, whilst avoiding the use of a fixed or flexible casing, that any deformation of the tyre is prevented, as is any detachment, particularly of the edges of the tread from the carcase in the first phase of the heating process.

According to the invention this problem is solved in that prior to the start of the heating process a stressing belt is drawn with a stress which is uniformly distributed over the tyre periphery onto the tread which has been applied to the carcase in air occlusion-free manner for pressing down or holding the tread onto the tyre carcase particularly at the edges and, if it exists, on the joint of the tread during the temperature-dependent reduction of the adhesive power of the bonding rubber through the heating process.

The method according to the present invention permits a completely satisfactory vulcanizing on of a prevulcanized tread due to the forces or stress uniformly distributed over the tyre previously by the fitted stressing belt, under the influence of which the edges of the tread which are elastically shaped and more specifically laterally bent downwards during the rolling process on the carcase cannot lift from the said carcase when, during the first phase of the heating process the adhesive power of the bonding rubber decreases due to the temperature-dependent increase in the plasticity thereof. It is important that the stressing belt uniformly presses the whole tread onto the tyre carcase because only in this way it is possible to avoid the undesired deformations of the tyre, together with the displacement of the tread on the carcase during the flowing away of the bonding rubber. There must be no air occlusions between the contact surfaces of the bonding rubber, the tread and the tyre carcase which during vulcanization could lead to defects. Therefore, to avoid such air occlusions an appropriate rolling process must be used when applying the bonding rubber to the trend and when applying the tread provided with bonding rubber to the carcase. For safety reasons this process can also be performed under vacuum, either in a vacuum chamber in which rolling tools are provided or with air exclusion and protected by a casing under vacuum action and fitted throughout the duration of the rolling process, whereby the said casing cannot be compared with the casing mentioned hereinbefore, being removed from the carcase after rolling the bonding rubber and tread and before applying the stressing belt.

If instead of an endless tread in annular form, a tread portion is to be vulcanized onto the tyre, for the completely satisfactory vulcanizing on of the tread in the area of its joint, the same applies as stated hereinbefore for pressing down or against the carcase, the longitudinally directed edges of the tread.

There are various possibilities for the complete vulcanization of the bonding rubber of the build tyre equipped with a stressing belt of the type indicated hereinbefore. Thus, it is advantageous if, when using a pressure chamber, a tyre carcase, e.g. a nylon cord tyre which tends to deform is directly or indirectly internally placed under an overpressure as compared with the pressure level in the pressure chamber in order to increase the contact pressure between tread and belt. Direct pressure production is used in the case of tubeless tyres and in the case of tyres placed directly onto the rim or the like, whilst the internal pressure can be produced indirectly by means of a compression tube. In both cases, the internal production of pressure leads to an increase in the contact pressure between tread and stressing belt, provided that the ambient pressure, i.e. the pressure level in the pressure chamber is below the internal pressure of the tyre.

Whilst the heating of the tyre for vulcanization purposes frequently takes place in a heated pressure chamber, in certain applications it can be advantageous if the necessary pressure is produced in conjunction with an internal pressure heating within the carcase. Additionally, for reducing the heating time, the tyre can be placed in a heated chamber without an overpressure.

Unless an annular tread is used, it is well known that a tread tends to lift from the carcase particularly at the joint if the adhesive power of the bonding rubber is reduced during the first phase of the heating process. In certain applications where there is a particularly high restoring force at the joint, it can be advantageous to aid the action of the stressing belt by placing a band over the tread joint which is firmly connected with the tread surfaces on either side of the said joint, for example by pressing in or inserting clips. The band need only be sufficiently large that on either side of the joint there is a sufficiently large band surface for fitting connecting means such as clips or the like. After the complete vulcanization of the tyre, the band can be easily detached from the tyre after removing the clips.

The action of the stressing belt during the securing and pressing down of the edges of the tread can be further assisted by placing additional bonding rubber strips on the carcase in the area below the edges of the tread where they are pressed down. In this case, for example, the bonding rubber plate is applied to the underside of the tread in air occlusion-free manner, in order to then apply both the said members in air occlusion-free manner and using pressure to the carcase to which have previously been applied and pressed down the said bonding rubber strips in the area which comes into engagement with the edge areas of the undersurface of the tread. This greatly increases the adhesion force of the bonding rubber layer at the outer edges.

According to a further development of the invention, the edges or portions of the tyre carcase positioned in the area of the edges of the tread are trimmed and is made good by an unvulcanized rubber wedge. This unvulcanized rubber wedge which is preferably also embraced and secured by the stressing belt permits on the one hand with completely satisfactory flowing away, the formation of a smooth transition between the edges of the tread and the carcase side walls and serves on the other for the retreading of the upper portion of the carcase sidewalls as well for applying markings or the like.

For the performance of the above-described method an elastic stressing belt is provided according to the invention. Due to an appropriate elasticity, the necessary uniform distribution of the stress applied by the stressing belt is achieved. This simultaneously facilitates the drawing on of the belt and the removal thereof from the vulcanized tyre. Furthermore, by means of such an elastically constructed stressing belt, tyres of the most varied sizes and more particularly varied widths can be embraced, so that it is only necessary to keep a relatively small set of different belt sizes in retreading works.

According to an important further development of the invention, the stressing belt has a pressure-permeable construction. As a result, when the tyre is heated in a heated pressure chamber, the action of the pressure medium passes through the belt and also reaches the base of the profile between the profiles. Therefore, the pressure exerted by the pressure medium in the overpressure chamber acts simultaneously on the whole tyre surface.

Advantageously, the stressing belt is made shrinkable by means of a suitable belt material, an appropriate multilayer structure or an appropriate distribution of a suitable material, weave type, coating or the like in the longitudinal direction, i.e. in the peripheral direction accompanied by thermal action and/or moisture action or the like. Thus, the pressure exerted by the belt on the tread can be considerably increased when used, namely as soon as the tyre equipped with the stressing belt is exposed to the heat and/or moisture of the heated pressure chamber.

A material which is suitable for a shrinkable stressing belt is, for example, polyamide (Nylon) or polyester. Both materials are preferably used in the form of fabrics for the stressing belt. Thus, stressing belts made from polyamide fabric are used for wet vulcanization, i.e. for vulcanizing in water, in wet or dry steam or in a mixture of air and stream, whereby the shrinkage effect of the fabric can be further reinforced by additional wetting prior to vulcanization. Polyester fabrics are used for dry vulcanization, i.e. for example, for vulcanizing with hot air. In both cases, shrinkage commences very soon after the action of heat on the fabric or other shrink-prone material. Among the types of fabric which can be used, particular preference is given to taffeta, which used to be called linen texture. A more pronounced shrinkage effect can be obtained by using a twill texture, i.e. on selecting a diagonal texture. The twill texture can also be used for elastic belts without shrinkage action, whereby the type of weave and the special finish used are decisive for the elasticity of the thread material.

The degree of longitudinal shrinkage can be controlled in various ways. In the case of a multilayer structure, it is possible for example to link a fabric with longitudinal and transverse threads at right angles to one another with a diagonal fabric layer whose threads run approximately in the transverse direction of the tyre at a very acute angle to one another. The former fabric layer causes a very pronounced shrinkage of the belt, whereas the reinforcing diagonal fabric hardly contributes to the belt shrinkage.

However, it is also possible to use fabrics made from synthetic fibers which do not even shrink in the presence of heat and/or moisture but which for example are provided along their edges with a cord or strip of a shrinkable material in such a way that the shrinking cords draw together the fabric and for example by a resulting shortening of the longitudinal threads of the fabric bring about a fabric shrinkage in the longitudinal direction of the tyre.

It is also advantageous if the elastic stressing belt has a weave type, tie type or the like which brings about a stress compensation by distributing local stress peaks over the belt periphery.

Furthermore, the stressing belt can be characterized by diagonal fabric layers, so that by selecting different fabric angles depending on the specific tensile force of the selected belt material, on stressing the belt a tensile force or stress is produced in the belt determined as a function of the stress path. The smaller the angle of the longitudinal and transverse threads, the more extensible the stressing belt and the larger the stressing path which must be covered to reach a maximum tensile force within the belt. Very rigid stressing belts or in other words those with a limited travel stroke require diagonal fabric layers with a relatively large angle of inclination between the longitudinal and transverse threads, i.e. an angle which in fact comes close to a right angle between the two thread types. It is also possible to interweave diagonal fabric layers with different angles of inclination or to connect the same in superimposed manner. To stabilize and limit the extensibility of the stressing belt fabric, it is also advantageous to use a fabric whose threads form triangles. This can also be achieved by two diagonal fabric layers formed in a particular manner and then being superimposed.

The fabric threads can run at different angles or curves in the centre and at the edges, so that the extensibility of the belt can vary zonally.

For example, a fabric can be used whose curved or parabolic threads relatively flatly interengage in the center of the stressing belt, i.e. where the curved pattern of the threads approximately corresponds to the transverse direction of the tyre and then become increasingly steep towards the sides of the belt and finally running almost parallel to one another, so that at the edge they greatly reduce the belt extensibility or when shrinkable fabric threads are used, bring about a shrinkage in the edge areas of the belt. The same action can be brought about by an undulating thread configuration in the longitudinal direction of the belt, whereby the threads in the centre of the belt have a very limited inclination as compared with the transverse direction of the belt and are always steeply inclined at the edges. The edges of a highly extensible belt fabric, for example a flat diagonal fabric can always be reinforced by weaving in or applying a diagonal fabric with a relatively steep thread angle, if the edge areas of the stressing belt are to be made more taut.

It is also possible to locally regulate the stress obtainable by means of the stressing belt by varyingly large and varyingly densely arranged fabric or material recesses in the stressing belt. For example, when a rubber material in the manner of a net or screen and provided with holes is used for producing the stressing belt, the arrangement and size of the holes on the edge differ from those in the center of the belt in such a way that the holes on the belt edges have a larger spacing and/or a smaller diameter than the holes in the centre of the belt. This provides the advantage that the elasticity of the stressing belt increases from the centre to the edges because the main function of the belt is to compensate the restoring forces of the elastically deformed tread which are released during the first heat phase when the adhesion force of the bonding rubber material declines. As a result of one or more of the above-indicated measures, it is possible to obtain a desirable, zonally varying elasticity. The use of a stressing belt with an increasing thickness of the elastic belt material towards the edges contributes to this action.

Furthermore, the belt material can be reinforced by linings of embedded threads or wires.

For the purpose of receiving a side ring profile, the stressing belt is preferably wider than the contact surface of the tread. The side ring profile comprises for example strips or moulded portions applied in the area of the transition between the edges of the tread and the carcase and which serve to aid shaping in this area. The side ring profiles are pressed onto the carcase or the edges of the tread by the stressing belt in order to exert from the side pressure on the seam between tread and carcase.

When a suitable material is selected for the belt material, the elasticity of the stressing belt can be brought about by means of a suitable type of weave. Unsuitable weave type is for example a twill texture combined with a preferably elastic thread which receives its elasticity either on the basis of a particular deformation or due to its material or to both. As stated hereinbefore, the special finish used is a further contributory factor.

The length of the stressing belt is advantageously made adjustable by end portions which are on the one hand provided with holes and on the other with buttons, particularly of metal or by a belt clasp. In this case, for closing the stressing belt placed round the tread of the built tyre, it is merely necessary, after tightening the belt to button the end portion provided with holes to the other end portion provided with buttons in a random position. It is equally easy to remove the stressing belt. Due to this possibility of adjusting the length, the same stressing belt can be used on tyres of different sizes.

The stressing belt can be made in one piece with reinforcements at the sides, whereby it is appropriately adapted to the tread width, although due to the elasticity of the stressing belt, it is also possible to adapt to the different tyre widths. The lateral reinforcements further secure the stressing belt to the built tyre.

However, the stressing belt can also be made from a plurality of individual juxtaposed and/or superimposed belt portions. A stressing belt in several parts provides a better possibility of adaptation to a relatively large number of tyres of different width. Preferably the stressing belt is longitudinally sub-divided into two halves, whereby the two halves can be overlapped in the centre of the tread, whereby as a result of the possibility of a varyingly large degree of overlapping, it is possible to adapt in simple manner to varyingly wide tyres.

The split stressing belt is preferably grooved on the top and bottom in the longitudinal direction so that it cannot slide off the tyre and so that the desired stress can also be applied in the transverse direction of the tyre.

The stressing belt can also comprise juxtaposed ropes, threads, cables or the like.

A particularly advantageous combination is provided of the band applied to the joint of the tread and which is for example secured by means of clips, has buttons by means of which the belt ends provided with corresponding holes can be fixed to the belt in different positions. In this case, the stressing belt is fundamentally buttoned to the joint band provided for this purpose with corresponding buttons which are preferably made from metal.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims. In the drawings show:

DETAILED DESCRIPTION OF THE PREFERRED EMBODIMENTS

Figure 1:
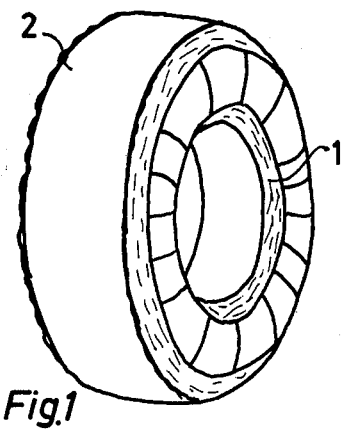
FIG. 1 a perspective view prior to vulcanization of a built tyre provided with a stressing belt in the manner of the invention.

FIG. 1 shows a built tyre with a carcase 1 onto which is drawn a stressing belt 2 which on either side extends over the edges of the tread strip and preferably embraces the latter.

Figure 2:
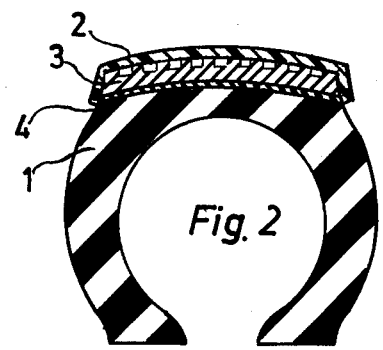
FIG. 2 a cross-sectional view of a tyre with the stressing belt applied.
Figure 4:
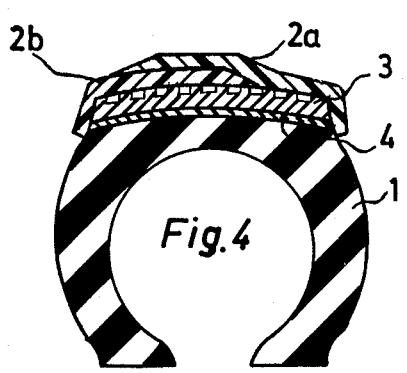
FIG. 4 a cross-sectional view of a built tyre with a two-part stressing belt applied thereto.
Figure 3:
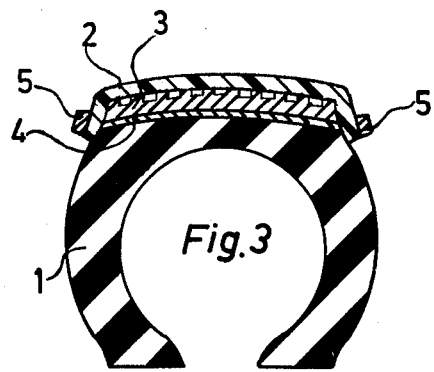
FIG. 3 a cross-sectional view of a tyre with a stressing belt having lateral reinforcements.
Figures 3A, 4A:
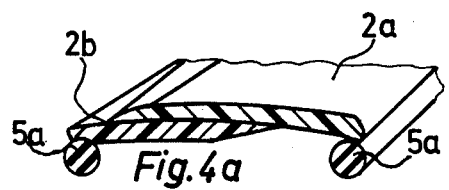
FIG. 3a a schematic perspective view of a portion of a stressing belt in the unstressed state with reinforcements fixed to the sides.
FIG. 4a a schematic perspective view of a portion of a two-part stressing belt with lateral reinforcements.
Figures 4B, 5A:
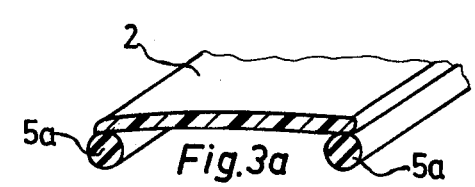
FIG. 4b a schematic perspective view of a portion of a two-part stressing belt with reinforcements on both sides as well as with a wedge-shaped profile in cross-section, FIG. 5 a partial view of a built tyre in section with a two-part stressing belt whose top bottom is longitudinally grooved.
FIG. 5a a schematic perspective view of a two-part stressing belt whose top and bottom are provided with longitudinal grooves in the unstressed state.

A cross-sectional view in FIG. 2 shows the conventional construction of a built tyre onto the carcase 1 of which is applied by rolling in air occlusion-free manner a bonding rubber plate 4 and a prevulcanized tread 3, for example through avoiding air occlusions as when using a vaccum chamber. Onto this is drawn the stressing belt 2 shown in FIG. 1 in the manner shown in FIG. 2.

The stressing belt 2 is made from elastic material, for example a fabric which is itself elastic, either due to the type of weave thereof and/or through the thread material.

The material used is, for example, rubber, whereby wires or threads can be embedded therein as reinforcements. Polyamide or polyester is used as the elastic and simultaneously shrinkable thread material. The action of varyingly formed fabrics is described hereinafter.

The stressing belt 2 is pressure-permeable, i.e. the pressure surrounding the tyre passes through the belt and is effective in the profile depressions of the tread profile. If a fabric is not used and instead the belt is made on a continuous basis from a material such as, for example rubber, stressing belt 2 is in screen or network form for the above purpose.

As shown in FIGS. 2, 3a, 4a, 4b 5a and 7 the longitudinal edges of the belt can be provided with reinforcements 5, 5a so that the elastic stressing belt 2 after being drawn on is additionally secured by these reinforcements. The reinforcements can comprise elastic bands, strips or loops 5a fixed to the edges of the belt. If for this purpose shrinkable materials are used, a particularly effective securing on the belt edges is brought about.

FIGS. 4, 4a, 4b, 5, 5a show that the stressing belt can be longitudinally divided into two halves 2a, 2b whereby the two halves 2a, 2b overlap with an adequate degree of coverage, so that there is a reliable securing to the tyre even in the transverse direction thereof. Preferably, when sub-divided longitudinally into two halves 2a, 2b the stressing belt has longitudinal grooves 6 on the top and bottom (cf. FIGS. 5 and 5a) so that the two halves 2a, 2b are additionally secured by the reciprocal engagement of longitudinal grooves 6 and the corresponding raised profiles. The belt havles 2a, 2b are in each case wedge-shaped at the inner edges and are always completely identical, enabling them to be used on the left and right-hand sides provided that the longitudinal grooves are present both on the top and bottom. The longitudinal sub-division makes it possible to use the same belt havles 2a, 2b for different tyre widths.

FIGS. 3a, 4a, 4b and 5a show the shape of the stressing belt 2 or the stressing belt halves 2a, 2b in the rest position, i.e. when the belt is not applied. Solely, in order to facilitate comprehension in FIGS. 4a, 4b and 5a the two belt halves 2a, 2b in the unstressed state are shown in reciprocal engagement.

The stressing belt 2 and the stressing belt halves 2a, 2b can be constructed as a closed loop or connectable in band form. A connection can for example be in the form of a clasp, whereby one end of the belt is provided with a plurality of rows of buttons which are preferably made from metal and the other end of the belt has buttonholes whose arrangement corresponds to that of the buttons. Reference will be made thereto in conjunction with FIG. 9. A stressing belt 2 or the corresponding stressing belt halves 2a, 2b provided with such a connection is adjustable as regards length depending on which row of buttons is engaged with a particular row of holes. If the tensile force of a belt is reduced, it is in this way possible to button the belt more tightly so that the necessary contact pressure is obtained.

Figure 8:
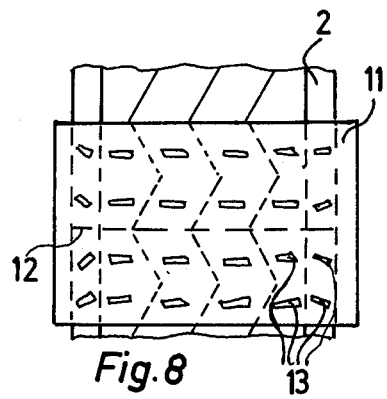
FIG. 8 a schematic plan view of a band fixed over the joint of the tread.

FIG. 8 shows that a joint 12 of tread 3 can in the case of very high restoring forces be covered by a band 11, for example of plastic or a strong fabric which is secured with clips 13 which are driven into the tread 3. Band 11 aids the action of stressing belt 2 on pressing tread 3 down onto or against carcase 1 in the area of joint 12 whose tread edges on either side tend to become detached from carcase 1 when the adhesion force of bonding rubber plate 4 is reduced. Preferably, band 11, in the manner shown in FIG. 9 simultaneously serves as part of the clasp or belt connection in that it carries the buttons 21 by means of which the end portions of stressing belt 2 or stressing belt halves 2a, 2b can be buttoned together by means of the buttonhole construction.

Figure 6:
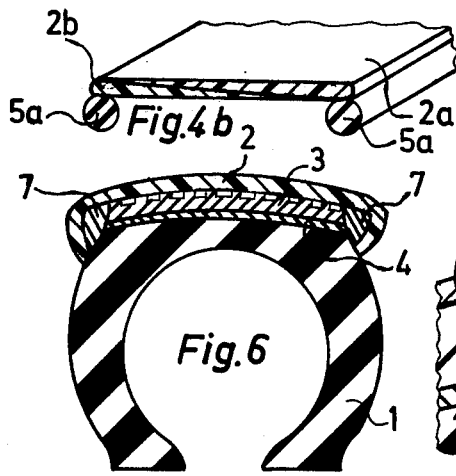
FIG. 6 a cross-sectional view of a built tyre with a stressing belt which, in addition to the tread, also embraces a side ring profile on both sides.
Figure 5:
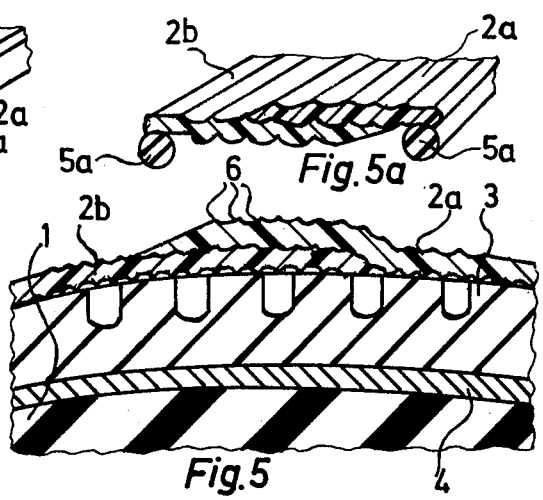

In the embodiment of FIG. 6 on either side of the tread edges are provided side ring profile 7 which are also embraced by the stressing belt 2 and serve for shaping purposes in this area.

Figure 7:
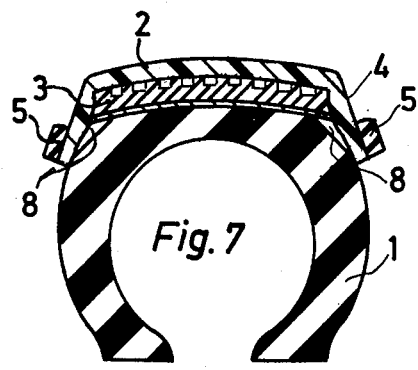
FIG. 7 a cross-sectional view of a built tyre with a stressing belt having lateral reinforcements embracing on both sides unvulcanized rubber wedges underneath the edges of the tread.

In the embodiment according to FIG. 7 the upper edges of carcase 1 are chamfered and for the purpose indicated hereinbefore are replaced by unvulcanized rubber wedges 8. The latter are also embraced by the stressing belt 2 which is in this embodiment provided with lateral reinforcements 5.

Figure 10:
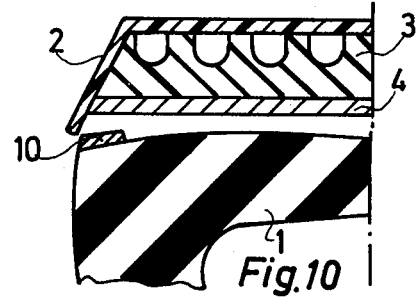
FIG. 10 part of a cross-sectional view of a built tyre in the pulled apart position with applied additional bonding rubber band.

In FIG. 10 carcase 1 is provided with additional bonding rubber strips 10 in the upper edge area in order to bring about increased adhesion of the edges of tread 3 to carcase 1. For ease of reference only, tread 3 provided with stressing belt 2 is shown raised from the carcase.

Figure 12:
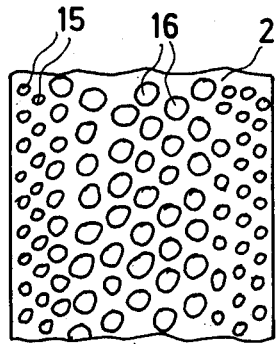
FIG. 12 a schematic plan view of a portion of a stressing belt provided with holes having a varying arrangement and size.

In FIG. 12 the stressing belt 2 is constructed in homogeneous manner from an elastic material, for example rubber whereby to obtain an increased tensile force towards the sides in the state when applied to a built tyre the holes, which bring about the pressure permeability, decline from a size 16 to a size 15.

Figure 11:
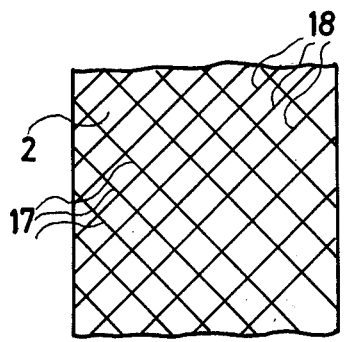
FIG. 11 a schematic plan view of a portion of a woven stressing belt with diagonal fabric structure.

In the case of FIG. 11 the stressing belt 2 comprises a fabric with diagonal threads 17, 18.

Depending on the selected angle of intersection of threads 17, 18 it is possible to obtain a highly elastic or a taut fabric with limited extensibility in the longitudinal direction. In the fabric portion according to FIG. 15 the diagonal fabric 30 is reinforced on both sides by fabric strips 31, whose threads form a very steep angle to one another and consequently greatly limit the extensibility of the belt at the edges. The fabric strips 31 can either be woven into the basic fabric 30 or can be subsequently applied thereto.

Figure 13:
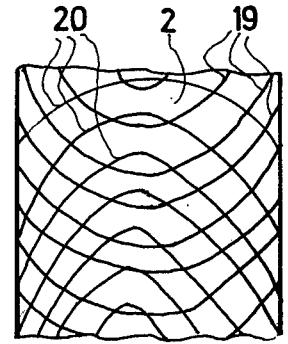
FIG. 13 a schematic plan view of a fabric belt portion with a curved configuration of the fabric structure.

FIG. 13 shows a stressing belt 2 made from a fabric with oppositely engaging thread loops 19, 20.

It can be seen that the thread configuration at the belt edges is always relatively steep to reduce the extensibility at the edges, whilst the central curved portions are directed in the transverse direction of the belt and consequently bring about a relatively high extensibility in the central portion of the belt.

Figure 14:
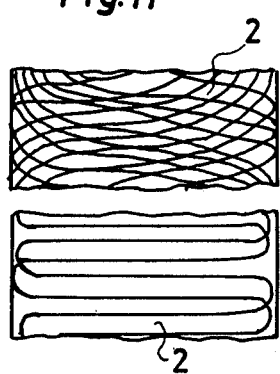
FIG. 14 a schematic plan view of a fabric belt portion with an undulating configuration of the fabric threads in two different constructions.
Figure 15:
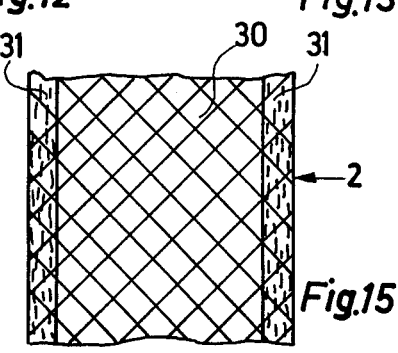
FIG. 15 a schematic plan view of a belt portion comprising a diagonal fabric with edges reinforced by fabric strips having a larger thread angle.

A similar action to that obtained with the fabrics according to FIGS. 13 and 15 is obtained with the fabric portions of FIG. 14 through an undulating configuration of the fabric threads.

The method according to the invention is performed in the following manner:

The bonding rubber plate 4, the tread 3 and optionally the side ring profile 7 or the unvulcanized rubber wedges 8 are applied in air occlusion-free manner to the worked carcase 1, whereby subsequently the elastic stressing belt 2 or the stressing belt halves 2a, 2b in the stressed state are applied to the tyre constructed in the above-indicated manner. In this stage, the stressing belt 2 exerts on the whole tread area a compressive force which is uniform in the longitudinal or peripheral direction of the tyre which, as will be explained in conjunction with FIGS. 12 to 15 can increase towards the sides in order to exert an increased pressure on the edges of the tread and simultaneously reliably secure stressing belt 2 to the tyre.

Figure 9:
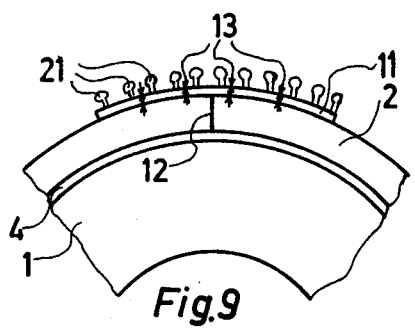
FIG. 9 a cross-sectional view of part of a built tyre with a band fixed to the tread and having buttons on the top and covering the joint.

If no tread ring is used, joint 12 is secured with band 11 in the manner shown in FIGS. 8 and 9 prior to applying stressing belt 2. The pressure of stressing belt 2 or stressing belt halves 2a, 2b exerts a constant pressure on tread 3 and bonding rubber plate 4 so that any air occlusions are displaced. For vulcanizing purposes, the built tyre is now placed in a pressure chamber where in per se known manner it is exposed to a pressure and heat action whilst using a known heating medium such as steam, a steam-air mixture, air or water. If the stressing belt is made from a shrinkable material or fabric, the pressure which is now exerted by the belt on the tyre is increased, particularly in the edge area if increased shrinkage occurs there due to the material distribution or type of weave. With increased heating of the tyre, the plasticity of the bonding rubber increases and its adhesion force simultaneously declines. However, the restoring forces in the tread particularly at the edges thereof and at the joint caused by the elastic deformation of the tread cannot cause the detachment of the latter particularly in the edge area because the stressing belt 2 or the stressing belt halves 2a, 2b exert a firm pressure on tread 3 particularly in the edge area. It is important that stressing belt 2 or stressing belt halves, 2a, 2b exert a uniform pressure in the peripheral direction of the tyre because in this way with declining adhesion force of the bonding rubber, there can be no undesired displacements of the tread relative to the carcase. The bonding rubber can uniformly flow away. As the stressing belt is pressure-permeable, the overpressure in the pressure chamber acts not only on the top of the tread profiles but also in the profile depressions, so that a non-uniform pressure is also prevented in the latter.

In place of an external overpressure produced in the pressure chamber, the desired pressure action can also be brought about indirectly by using a pressure tube within the tyre carcase or directly by producing the pressure in carcase 1 which is then placed on rims because in this case the carcase 1 is pressed against the stressing belt. It is also possible to utilize an internal pressure heating within the carcase without using an overpressure chamber. At the end of vulcanization, the stressing belt is removed from the finished tyre and is available for reuse.

Figure 16:
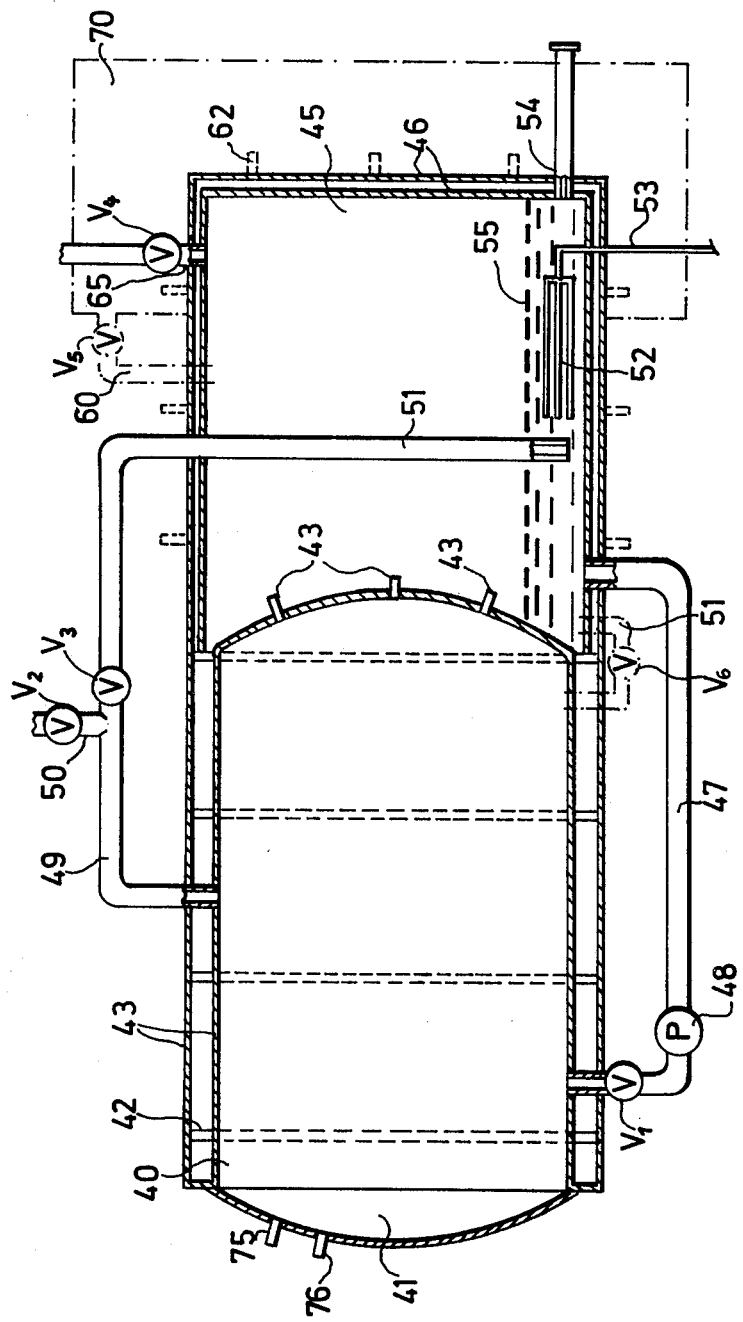
FIG. 16 a schematic view of a cross-section of an autoclave for performing the method according to the invention.

The autoclave shown in FIG. 16 is preferably used for performing the above-described method according to the invention and has a chamber 40 which receives the built tyre and the said chamber can be sealed in pressure-tight manner by a lid 41. The chamber 40 serves as a pressure chamber and is therefore externally reinforced with fittings 42 in conventional manner. The chamber 40 can have a double wall 43 for better insulation of the pressure and heating area thereof.

The reservoir 45 is directly connected to chamber 40 whereby the said reservoir also preferably has a double wall 46 with corresponding insulation. A connecting line 47 with a hydraulic pump 48 passes from reservoir 45 via a valve V 1 to chamber 40. On the top of chamber 40 is provided a return line 49 having an appropriately upwardly directed branch 50 with a valve V 2 and is passed via a pressure-setable relief valve V 3 into reservoir 45 where the line terminates just before the base of reservoir 45 in the form of an immersion tube 51. Adjacent to the base of reservoir 45 is provided a heating system 52 which preferably functions electrically and has a power supply 53.

The autoclave functions in the following manner:

Via a liquid supply pipe 54, reservoir 45 is filled with liquid, preferably water. The filled liquid is heated via heating system 52. After introducing the built tyre into chamber 40, the latter is sealed in pressure-tight manner by means of lid 41. With valves V 1, V 2 and V 4 open, hot water is now supplied by means of pump 48 via connecting line 47 from reservoir 45 into chamber 40 which during the filling operation is vented via valve V 2 whilst reservoir 45 is ventilated via valve V 4 corresponding to the drop in the water level 55. When the air has been completely removed from chamber 40 via valve V 2, the latter closes and water level 55 is approximately at the level shown in FIG. 16. Pump 48 now brings the water in chamber 40 to a pressure of about 5 – 6 atm. to which value relief valve V 3 is set and which now permits the return of part of the hot water for the purpose of circulating the same. It is important to point out that through the return by means of immersion tube 51 into the residual liquid of reservoir 45, an enrichment of the returned water with oxygen is avoided so that the water does not have a corrosive action on the walls of the autoclave and the lines. The partial return of the liquid of chamber 40 serves to maintain a specific adjustable temperature via heating system 52, particularly during the first phase of heating of the built tyre introduced into the autoclave. The reason for this is that in the first phase, the thermal capacity absorbed by the tyre is relatively high.

At the end of the normal vulcanization time, line 49 is ventilated and valve V 2 and valve V 4 opened. By operating pump 48 which is appropriately provided for this purpose with reversible valves and via connecting line 47, the hot water charge can be returned to reservoir 45 for reuse when the next built tyre is introduced into chamber 40.

The advantages of the autoclave system according to the invention are obvious. The energy savings through the reuse of heated liquid charge is just as important as the time saving resulting from the availability of a heating medium permanently kept at the vulcanization temperature. In addition, cheaper off-peak electricity can be used for heating the liquid charge in reservoir 45.

An alternative of the new autoclave system indicated by dotted lines in FIG. 16 provides for the connection to reservoir 45 of a pressure line 60 with a valve at V 5 for an inert gas such as nitrogen. The reservoir 45 is connected with chamber 40 via a second connecting line 61 and a valve V 6. In this case it is unnecessary to construct the return line 49 in reservoir 45 as an immersion tube 51. However, the reservoir is now provided with fitting 62 because in this case it functions as the pressure chamber.

The operation of this alternative embodiment of the autoclave according to FIG. 16 is as follows:

After closing chamber 40 and with valve V 6 open the hot water is passed from reservoir 45 via connecting line 61 into chamber 40 in such a way that valve V 5 opens, thereby pressurizing the chamber and the liquid charge in reservoir 45. After filling chamber 40 with hot water valve V 2 closes as in the first case and here again pump 48 assumes the function of raising the pressure in the hot water in chamber 40 to the necessary vulcanization pressure until the set relief valve V 3 frees the way for the water circulation with valve V 6 closed. As in the first embodiment, the return of the hot water at the end of vulcanization takes place via conecting line 47 whereby the inert gas charge located above the hot water residue in the reservoir is either discharged or supplied to a pressure gas tank again from which it can be supplied whenever necessary via pressure line 60 to reservoir 45.

The second alternative for operating the autoclave has the advantage that there can be no corrosive medium within reservoir 45 and otherwise all the advantages explained relative to the first alternative are still retained.

A combination of the two above-mentioned systems forms a third alternative in which via a connection 65 mounted on reservoir 45 and carrying valve V 4, inert gas flows into reservoir 45 for ventilating the hot water charge when chamber 40 is filled via connecting line 47 by drawing off from reservoir 45. As a result, above water level 55 it is not an air charge which is formed but an inert gas charge such as, for example a nitrogen charge so that there is no danger of an undesired enrichment of the liquid medium by oxygen, making it unnecessary to construct the return line 49 as an immersion tube 51.

At the end of the particular vulcanization process when the hot water is returned from chamber 40 into reservoir 45, the inert gas is again returned to the inert gas reservoir from reservoir 45 via connection 65 with valve V 4 open. The inert gas reservoir comprises for example a pressure container 70 shown in FIG. 16 by dotted lines. This solution has the further advantage that the reservoir 45 need not necessarily be constructed as a pressure container and correspondingly need not therefore be reinforced. A prerequisite for this is that the volumes between the inert gas charge in reservoir 45 and in pressure tank 70 are matched to one another in such a way that no high pressure differences occur between pressure container 70 and reservoir 45 and changing the inert gas charge necessary for reservoir 45.

In FIG. 16, 75 and 76 are connections for the vacuum and overpresssure lines.

While there has been described and illustrated the preferred embodiments of the invention, it is to be understood that these are capable of variation and modification and it is not therefore desired to be limited to the precise details set forth but to include such modifications and alterations as fall within the scope of the appended claims.

What is claimed is:

1. A method for retreading a tire carcass having an arcuate tread engaging crown with a prevulcanized annular tread having a pattern of ribs and grooves on its exterior road enaging surface and a substantially flat interior cross sectional configuration when in the unstressed state; said method comprising:

(a) applying the tread to the crown of the carcass with an unvulcanized bonding rubber intermediate layer therebetween, the tread being elastically deformed to conform to the carcass crown, the application of the tread to the carcass being effected in such a manner that the occlusion of air between the tread and the carcass is avoided;

(b) securing a stressing belt annularly around the assembled tread and carcass, said stressing belt being an elongated endless band extending annularly around the road engaging surface of the assembled tread with its longitudinal direction running in the same direction as the tread and its width corresponding at least to that of the tread, the belt having openings to allow a surrounding fluid to pass therethrough to at least some of the road engaging surface of the tread so that the pressure of the fluid is transmitted to all of the ribs and grooves of the tread, said belt further being elastic, secured annularly around the tire and pressed thereagainst by shrinkage in its longitudinal direction under the influence of heat and moisture thereby providing around the longitudinal direction of the tread a uniform, radially inwardly directed stress to hold the elastically deformed tread on the carcass, said belt further being capable of withstanding elevated temperatures and pressures sufficient to vulcanize said bonding rubber intermediate layer;

(c) vulcanizing the intermediate layer of bonding rubber by subjecting the tread and carcass assembly with the fluid-permeable, shrinkable and elastic stressing belt therearound to the action of heat and pressure in an enclosed chamber whereby as the adhesive power of the intermediate layer of bonding rubber decreases during heating prior to vulcanization, the tread is held securely in position and distortion of the carcass or of the bonding rubber layer is avoided.

2. A stressing belt for use in retreading a tire carcass having an arcuate tread engaging crown wherein a prevulcanized annular tread having a pattern of ribs and grooves on its exterior road engaging surface and a substantially flat interior cross sectional configuration is assembled on the crown with an intermediate layer of unvulcanized bonding rubber therebetween, said belt being an elongated, endless band extending annularly around the road engaging surface of the assembled tread with its longitudinal direction running in the same direction as the tread and its width corresponding at least to that of the tread, the belt having openings to allow a surrounding fluid to pass therethrough to at least some of the road engaging surface of the tread so that the pressure of the fluid will be transmitted to all of the ribs and grooves of the tread, said belt further being elastic, secured annularly around the tire and pressed thereagainst by shrinkage in its longitudinal direction under the influence of heat and moisture thereby providing around the longitudinal direction of the tread a uniform, radially inwardly directed stress, said belt further being capable of withstanding elevated temperatures and pressures sufficient to vulcanize said bonding rubber intermediate layer.

3. A method as recited in claim 1 wherein the contact pressure between the tread and the stressing belt is increased by inflating the tire carcass to a pressure greater than the pressure in the pressure chamber.

4. A method as recited in claim 3 wherein the pressure is produced by internal pressure heating within the carcass.

5. A method as recited in claim 1 wherein the tread is initially formed as a flat strip which is cut to length, the ends of the cut strip are joined to form an annular tread and a band is placed over the tread joint and firmly connected to the tread on either side of the joint by means of clips inserted into the tread.

6. A method as recited in claim 1 wherein additional bonding rubber strips are placed on the carcass in the area below the tread edges.

7. A method as recited in claim 1 wherein the portions of the tire carcass adjacent the tread edge area are trimmed and replaced by an unvulcanized rubber wedge.

8. A stressing belt as recited in claim 2 wherein said belt comprises a polyester fiber fabric.

9. A stressing belt as recited in claim 2 wherein said belt comprises a polyamide fiber fabric.

10. A stressing belt as recited in claim 2 wherein said belt comprises woven elastic fabric, said fabric being woven in such a manner that it effects stress compensation by distributing local stress peaks around the entire belt periphery.

11. A stressing belt as recited in claim 2 wherein said belt is reinforced with diagonal fabric layers.

12. A stressing belt as recited in claim 2 wherein the angle between interwoven fabric threads at the center of said belt is different from the angle between interwoven fabric threads at the edges of the belt.

13. A stressing belt as recited in claim 10 wherein the elasticity of said belt is varied across the width of the belt by varying the density of the fiber arrangement in the belt fabric.

14. A stressing belt as recited in claim 2 wherein said belt comprises a perforated elastomeric web.

15. A stressing belt as recited in claim 14 wherein the elasticity of said belt is varied across the width of the belt by varying the density of the perforations in said elastomeric web.

16. A stressing belt as recited in claim 2 wherein said belt is wider than the width of the contact surface of the tread to enable the belt to receive a side ring profile.

17. A stressing belt as recited in claim 2 wherein said belt comprises a woven fabric of substantially inelastic fibers, and the elasticity of the belt is due to the manner in which the fibers are woven.

18. A stressing belt as recited in claim 2 wherein the tensile force exerted by the belt increases from the center to the edges of the belt in the transverse direction of the belt and tread.

19. A stressing belt as recited in claim 2 wherein said belt comprises an elongated strip provided with metal buttons at one end and a plurality of sets of buttonholes spaced different distances from the other end of said strip whereby the ends can be joined to provide annular belts of varying size.

20. A stressing belt as recited in claim 2 wherein said belt is manufactured in one piece with reinforcements on the sides whereby the width of the belt is adapted to the width of the tread.

21. A stressing belt as recited in claim 2 wherein said belt compises a plurality juxtaposed belt portions.

22. A stressing belt as recited in claim 21 wherein said belt comprises two separate complimentary belt portions which overlap one another in the center of the tread when placed around a carcass and tread assembly.

23. A stressing belt as recited in claim 22 wherein the overlapping portions of said belt portions are provided with interengaging, longitudinally oriented grooves on the top and bottom surfaces thereof.

24. A stressing belt as recited in claim 2 wherein said belt comprises a band adapted to be placed over a tread joint; said band being provided on one side thereof with a plurality of clips adapted to be inserted into the tread on either side of the joint; said band being further provided on the other side thereof, with a plurality of buttons whereby said band is secured to the remainder of said belt by engaging the buttons through buttonholes formed in the remainder of the belt.

* * * * *